(12) United States Patent
Tang et al.

(10) Patent No.: US 10,921,506 B2
(45) Date of Patent: Feb. 16, 2021

(54) LIGHT GUIDE PLATE, METHOD OF FABRICATING LIGHT GUIDE PLATE, BACKLIGHT MODULE, DISPLAY DEVICE

(71) Applicants: Hefei BOE Optoelectronics Technology Co., Ltd., Anhui (CN); BOE Technology Group Co., Ltd., Beijing (CN)

(72) Inventors: Hai Tang, Beijing (CN); Liang Gao, Beijing (CN); Lu Gao, Beijing (CN); Yezhou Tan, Beijing (CN); Jian Sang, Beijing (CN); Lu Yu, Beijing (CN); Heling Zhu, Beijing (CN); Dongmei Xie, Beijing (CN)

(73) Assignees: Hefei BOE Optoelectronics Technology Co., Ltd., Anhui (CN); BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 16/407,459

(22) Filed: May 9, 2019

(65) Prior Publication Data

US 2020/0150331 A1 May 14, 2020

(30) Foreign Application Priority Data

Nov. 12, 2018 (CN) .......................... 2018 1 1341956

(51) Int. Cl.
*G02B 6/00* (2006.01)
*F21V 8/00* (2006.01)
*G09G 3/22* (2006.01)

(52) U.S. Cl.
CPC .......... *G02B 6/0031* (2013.01); *G02B 6/0016* (2013.01); *G02B 6/0021* (2013.01); *G09G 3/22* (2013.01)

(58) Field of Classification Search
CPC .. G02B 6/0043; G02B 6/0031; G02B 6/0016; G02B 6/0021; G09G 3/22
See application file for complete search history.

(56) References Cited

U.S. PATENT DOCUMENTS

| 2003/0206408 | A1* | 11/2003 | Funamoto | G02B 6/0043 |
| | | | | 362/603 |
| 2014/0056027 | A1* | 2/2014 | Ma | G02B 6/0028 |
| | | | | 362/611 |

FOREIGN PATENT DOCUMENTS

| CN | 102109101 A | 6/2011 |
| CN | 102879942 A | 1/2013 |

(Continued)

OTHER PUBLICATIONS

Jan. 20, 2020—(CN) First Office Action Appn 201811341956.2 with English Translation.

(Continued)

*Primary Examiner* — Anne M Hines
(74) *Attorney, Agent, or Firm* — Banner & Witcoff, Ltd.

(57) ABSTRACT

A light guide plate, a method of fabricating a light guide plate, a backlight module and a display device are disclosed. The light guide plate includes a light guide layer and a grating layer. The light guide layer includes a light incident surface, a light exit surface, and a bottom surface opposite to the light exit surface. The grating layer is disposed on a side of the light guide layer with the light exit surface being on the side and including a plurality of grating strips. The bottom surface is provided with a plurality of optical dots. The plurality of optical dots are configured to deflect light rays from the light incident surface toward the grating strips. The plurality of grating strips are configured to deflect light rays emitted from the light exit surface toward a normal line of the light exit surface.

19 Claims, 8 Drawing Sheets

(56) References Cited

FOREIGN PATENT DOCUMENTS

| | | |
|---|---|---|
| CN | 205404871 U | 7/2016 |
| CN | 108089253 A | 5/2018 |
| JP | 2006120484 A | 5/2006 |

OTHER PUBLICATIONS

Yan Ze-Iin, et al., "Light Guide Plate of Back Light System", with English Translation, College of Engineering and Technology, Shenzhen University, Shenzhen, Guangdong 518060, China, Laser Journal (vol. 27. No. 3, 2006), pp. 5-7.

M. Niggemann, et al., Diffraction Gratings and Buried Nano-Electrodes-Archit Ectures for Organic Solar Cells, Fraunhofer Institute for Solar Energy Systems (ISE), Heidenhofstr. 2, 79110 Freiburg, Germany, Thin Solid Films 451-452 (2004) 619-623, © 2003 Elsevier B.V.

\* cited by examiner

LIGHT GUIDE PLATE, METHOD OF FABRICATING LIGHT GUIDE PLATE, BACKLIGHT MODULE, DISPLAY DEVICE

CROSS REFERENCE TO RELATED APPLICATIONS

The present application claims priority of Chinese Patent Application No. 201811341956.2 filed on Nov. 12, 2018, the disclosure of which is incorporated herein by reference in its entirety as part of the present application.

TECHNICAL FIELD

Embodiments of the present disclosure relate to a light guide plate, a backlight module, a display device and a method of fabricating a light guide plate.

BACKGROUND

While a display device brings convenience in work and life, the protection of a user's trade secrets and/or personal privacy is increasingly important, and the demand for screen anti-spying is increasing.

SUMMARY

Some embodiments of the present disclosure provide a light guide plate including a light guide layer and a grating layer. The light guide layer includes a light incident surface, a light exit surface, and a bottom surface opposite to the light exit surface. The grating layer is disposed on a side of the light guide layer with the light exit surface being on the side and including a plurality of grating strips. The bottom surface is provided with a plurality of optical dots. The plurality of optical dots are configured to deflect light rays from the light incident surface toward the grating strips. The plurality of grating strips are configured to deflect light rays emitted from the light exit surface toward a normal line of the light exit surface.

As an example, in some embodiments, the bottom surface is parallel to the light exit surface.

As an example, in some embodiments, a refractive index of the light guide layer is configured to allow total reflection of light to occur on the light exiting surface. Each of the plurality of optical dots includes a first surface configured to reflect the light rays from the light incident surface toward the grating strips. Each of the plurality of grating strips includes a first inclined surface configured to reflect the light emitted from the light exit surface toward a normal line of the light exit surface.

As an example, in some embodiments, the light guide plate further includes a bonding layer. The light guide layer and the grating layer are bonded by the bonding layer. A refractive index of the bonding layer, the refractive index of the light guide layer, and a refractive index of the grating layer comply with: n2<n1, n2≤n3, where n1 is the refractive index of the light guide layer, n2 is the refractive index of the bonding layer, and n3 is the refractive index of the grating layer.

As an example, in some embodiments, the refractive index of the bonding layer complies with: n2<1.45.

As an example, in some embodiments, in a cross section substantially perpendicular to both the light incident surface and the light exit surface, a second angle β between first surface and the light exit surface is in a range of 0.5~10°.

As an example, in some embodiments, each of the plurality of optical dot further includes a second surface. The second surface intersects the first surface. In a cross section substantially perpendicular to both the light incident surface and the light exit surface, a first angle α between the second surface and the light exit surface comply with:

$$\frac{\pi}{2} \geq \alpha > \frac{\pi}{2} - \arcsin\left(\frac{n2}{n1}\right).$$

As an example, in some embodiments, the plurality of optical dots are protrusions protruding outward from the bottom surface, and the second surface is closer to the light incident surface than the first surface.

As an example, in some embodiments, the plurality of optical dots are grooves recessed inward from the bottom surface, and the first surface is closer to the light incident surface than the second surface.

As an example, in some embodiments, each of the plurality of optical dots further includes a third surface and a fourth surface disposed opposite to each other. The third surface intersects the second surface and the first surface, and the fourth surface intersects the second surface and the first surface. A fourth angle δ1 between the third surface and the bottom surface is in a range of 50~90°, and a fifth angle δ2 between the fourth surface and the bottom surface is in a range of 50~90°.

As an example, in some embodiments, in a cross section substantially perpendicular to both the light incident surface and the light exit surface, a second angle β between the first surface and the light exit surface and a third angle γ between the first inclined surface and the light exit surface comply with:

$$\gamma = \frac{\pi}{2} - \frac{1}{2}\arcsin\left\{\frac{n1}{n3} \times \sin\left[\arcsin\left(\frac{n2}{n1}\right) - \beta\right]\right\}, \gamma \geq \arcsin\frac{1}{n3}.$$

As an example, in some embodiments, each of the plurality of grating strip further includes a light reflecting layer provided on the first inclined surface.

As an example, in some embodiments, each of the plurality of grating strip further includes: a second inclined surface and a top surface connecting the first inclined surface and the second inclined surface. The first inclined surface and the second inclined surface are opposite and parallel to each other. The first inclined surface is further away from the light incident surface than the second inclined surface, and the top surface is parallel to the light exit surface.

As an example, in some embodiments, in a cross section substantially perpendicular to both the light incident surface and the light exit surface, a second angle β between the first surface and the light exit surface and a height h of the grating strips and a width d2 of the grating strips comply with:

$$h \geq \frac{(1 + \cos\theta 4_{min})}{\tan\theta 4_{min}} \times d2, \text{ where } \theta 4_{min} = \arcsin\left\{\frac{n1}{n3} \times \sin\left[\arcsin\left(\frac{n2}{n1}\right) - 2\beta\right]\right\}.$$

As an example, in some embodiments, the plurality of grating strips are arranged in parallel and equidistantly in a direction perpendicular to the light incident surface As an example, in some embodiments, the grating layer includes a base sub-layer and a grating sub-layer. The base sub-layer and the grating sub-layer are integrated as a single piece, and the base sub-layer is disposed closer to the light guide layer. A shape of the base sub-layer is a rectangular parallelepiped, and the grating sub-layer includes the plurality of grating strips arranged in parallel and equidistantly.

As an example, in some embodiments, a density of the plurality of optical dots gradually increases in a direction away from the light incident surface.

Some embodiments of the present disclosure provide a backlight module including a backboard; a light guide plate disposed on the backboard; and a light source disposed on a side of the light guide plate with a light incident surface being on the side. The light guide plate includes a light guide layer and a grating layer. The light guide layer has the light incident surface, a light exit surface, and a bottom surface opposite to the light exit surface, the bottom surface being provided with a plurality of optical dots. The grating layer is disposed on a side of the light guide layer with the light exit surface and includes a plurality of grating strips. The plurality of optical dots are configured to deflect light rays from the light incident surface toward the grating strips, and the plurality of grating strips are configured to deflect light rays emitted from the light exit surface toward a normal line of the light exit surface.

Some embodiments of the present disclosure provide a display device including a display panel; and a backlight module as described above disposed on a light incident side of the display panel.

Some embodiments of the present disclosure provide a method of fabricating a light guide plate, the method including: forming a light guide layer by using a light guide layer mold, forming a grating layer by using a grating layer mold; and bonding the grating layer and the light guide layer. The light guiding layer includes a light incident surface, a light exit surface, and a bottom surface opposite to the light exit surface, and the bottom surface is provided with a plurality of optical dots. The grating layer is disposed on a side of the light guide layer with the light exit surface being on the side and includes a plurality of grating strips. The plurality of optical dots are configured to deflect light rays from the light incident surface toward the grating strips, and the plurality of grating strips are configured to deflect light rays emitted from the light exit surface toward a normal line of the light exit surface.

As an example, in some embodiments, the method further includes providing the light guide layer mold. Providing the light guide layer mold includes forming a dot-like structure complementary to the optical dots in shape by one of a group consisting of: engraving with a graver and striking with a striker. The striker has a head having a same shape as a shape of the optical dot.

As an example, in some embodiments, the method further includes providing a grating layer mold. Providing the grating layer mold includes scraping a grating-strip-like structure of the grating layer mold that is complementary to the grating strip in shape by scraping with a scraper.

As an example, in some embodiments, the grating layer and the light guide layer are bonded together using a bonding layer. A refractive index of the bonding layer, a refractive index of the light guide layer, and a refractive index of the grating layer comply with: $n2<n1$, $n2 \leq n3$, where n1 is the refractive index of the light guide layer, n2 is the refractive index of the bonding layer, and n3 is the refractive index of the grating layer.

BRIEF DESCRIPTION OF THE DRAWINGS

In order to clearly illustrate the technical solutions of the embodiments of the disclosure, the drawings of the embodiments will be briefly described in the following. It is obvious that the drawings described below are only related to some embodiments of the disclosure and thus are not limitative of the disclosure. Those skilled in the art can obtain other drawing(s), without any inventive work.

DETAILED DESCRIPTION

The technical solutions of the embodiment will be described in a clearly and completely way in connection with the drawings related to the embodiments of the disclosure. It is obvious that the described embodiments are just a part but not all of the embodiments of the disclosure. Based on the described embodiments herein, those skilled in the art can obtain other embodiment(s), without any inventive work, which should be within the scope of the disclosure.

Figure 1:
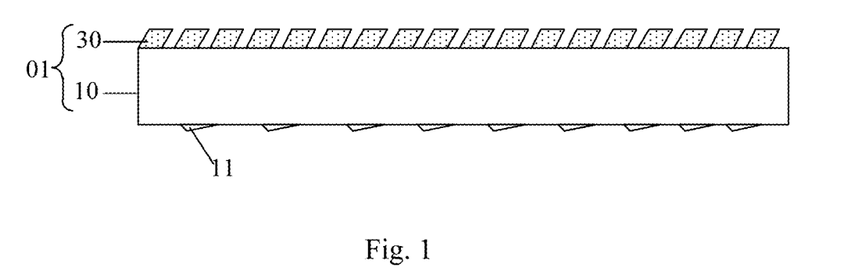
FIG. 1 is a schematic view of a structure of a light guide plate according to at least one embodiment of the present disclosure.
Figure 2:
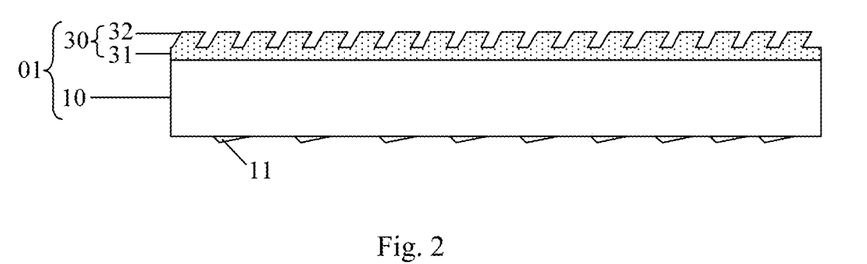
FIG. 2 is a schematic view of a structure of another light guide plate according to at least one embodiment of the present disclosure.
Figure 3A:
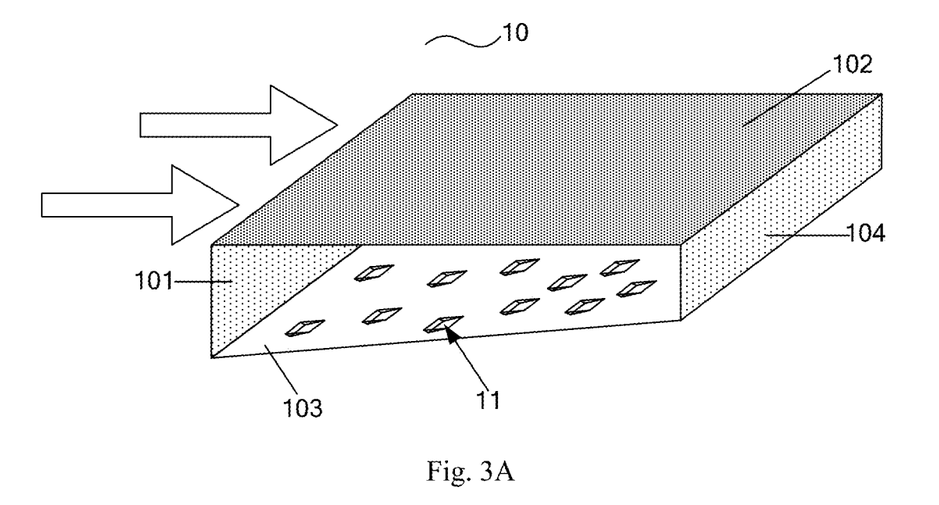
FIG. 3A is a schematic view of a structure of a light guide layer according to at least one embodiment of the present disclosure.
Figure 3B:
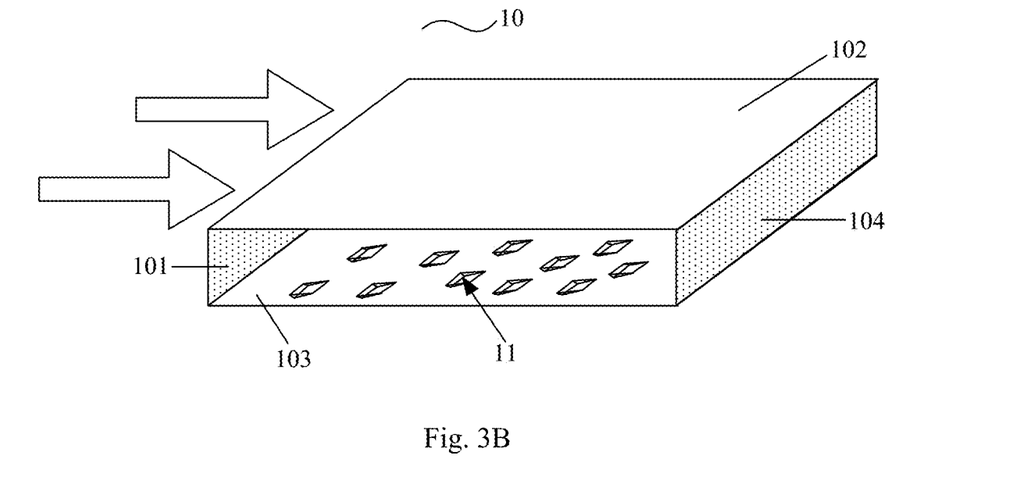
FIG. 3B is a schematic view of a structure of another light guide layer according to at least one embodiment of the present disclosure.
Figure 4:
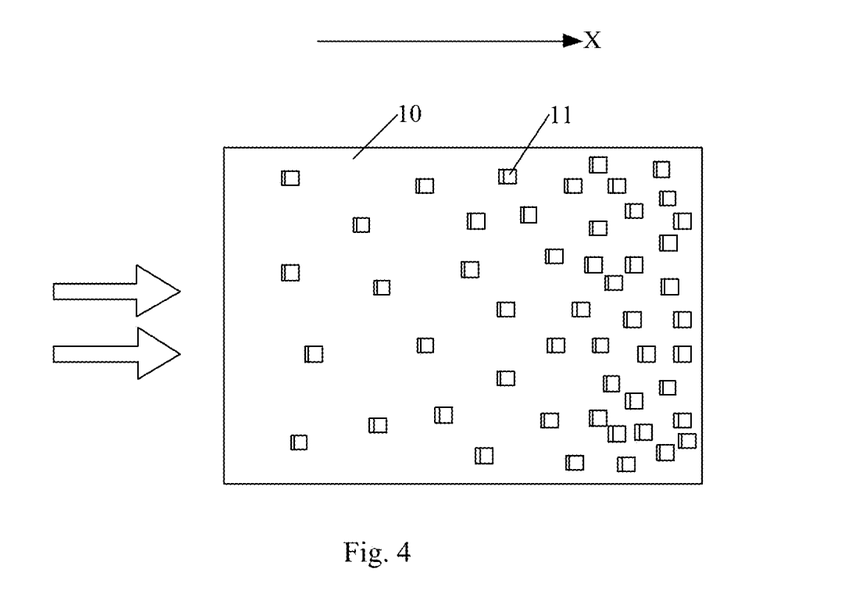
FIG. 4 is a schematic view of an arrangement of optical dots according to at least one embodiment of the present disclosure.

Unless otherwise defined, technical terms or scientific terms used herein are intended to be understood in the ordinary meaning of the ordinary skill of the art. The words "first", "second", and similar terms used in the present disclosure do not indicate any order, quantity, or importance, but are used to distinguish different components. Similarly, the words "include", "include" or the like means that the elements or items preceding the words contain the elements or items after the words and their equivalents, but do not exclude other elements or items. The words "connect", "interconnect" or the like are not limited to physical or mechanical connections, but may include electrical connections, either directly or indirectly. The words "upper", "lower", "left", "right" and the like are only used to indicate the relative positional relationships, and when the absolute position of the object described is changed, the relative positional relationship may also change accordingly An embodiment of the present disclosure provides a light guide plate (LGP) 01, and as shown in FIGS. 1 and 2, the LGP 01 includes a light guide layer 10 and a grating layer 30. The grating layer 30 is disposed on a side of the light guide layer 10 with a light exit surface 102 on the side, and includes a plurality of grating strips. As shown in FIGS. 3A, 3B and 4, the light guide layer 10 has a light incident surface 101, the light exit surface 102, and a bottom surface 103 opposite to the light exit surface 102. The bottom surface 103 is provided with a plurality of optical dots 11. The plurality of optical dots 11 are used to deflect light rays incident from the light incident surface 101 toward the grating strips. The optical dots 11 disperses optical paths of the light rays incident from the light incident surface 101, and causes the light rays to be emitted from the light exit surface 102 of the light guide layer 10. The grating strips are used to deflect the light emitted from the light exit surface toward the normal line of the light exit surface. For example, the grating strips converts the light rays incident thereon into collimated light rays in one dimension and emits the converted light rays.

In some embodiments, the light guide layer 10 and the grating layer 30 are formed separately and then bonded to each other.

Figure 5:
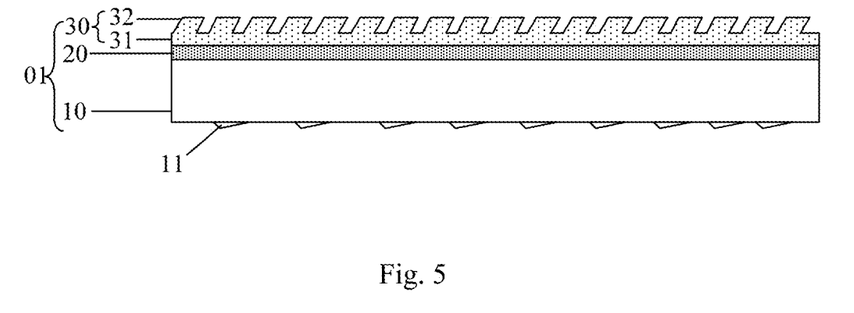
FIG. 5 is a schematic view of a structure of another light guide plate according to at least one embodiment of the present disclosure.
Figure 6:
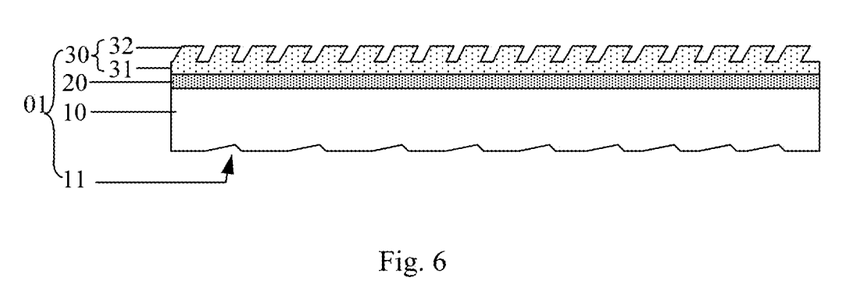
FIG. 6 is a schematic view of a structure of another light guide plate according to at least one embodiment of the present disclosure.

In some embodiments, as shown in FIGS. 1 and 2, the light guide layer 10 and the grating layer 30 may be in direct contact. In other embodiments, as shown in FIGS. 5 and 6, the light guide layer 10 and the grating layer 30 may also be bonded by, for example, a bonding layer 20.

At least one embodiment of the present disclosure provides the light guide plate 01. By providing a plurality of the optical dots 11 on the bottom surface 103 of the light guide layer 10 of the light guide plate 01, the optical paths are adjusted so that the light rays are reflected and allowed to be emitted from the light emitting surface 102. At the same time, by providing the grating layer 30 including the plurality of grating strips on the light exit surface 102 of the light guide plate 01, the light rays emitted from the grating layer are deflected toward the normal line of the light exit surface. Thus, for example, in the case where a backlight module including the light guide plate 01 is applied to a display device, a cutoff angle of the display device (the cutoff angle is an angle of view corresponding to an angular brightness of 1% of the center brightness) and a half brightness angle (the half-brightness angle is an angle of view corresponding to an angular brightness of 50% of the highest center brightness) reduces, and a anti-spy function is realized.

In at least an embodiment of the present disclosure, only by designing the light guide plate 01, the light emitted from the backlight module may be collimated in one dimension, thereby enabling the display device to realize the anti-spy function. Therefore, the light guide plate according to any of the embodiments of the present disclosure eliminates the need of a privacy film to realize the anti-spy function. Thus, a thickness of the display device is hardly increased, and a brightness of the display device is not lowered.

Alternatively, as shown in FIG. 3A and FIG. 3B, the light guide layer 10 further includes a sixth surface 104 opposite to the light incident surface 101.

Here, the sixth surface 104 is a non-light incident surface.

Alternatively, as shown in FIG. 4, in the direction X away from the light incident surface 101, the density of the plurality of optical dots 11 gradually increases.

In some embodiments, because a light source is disposed only on the side, where the light incident surface 101 is located, in the backlight module, the farther a local location away from the light incident surface 101 is, the darker the brightness of the local location is. Therefore, in at least one embodiment of the present disclosure, in the direction X away from the light incident surface, by gradually increasing the density of the optical dots 11, local brightness can be increased. Thus, the light guide plate 01 uniform the light brightness.

Alternatively, all optical dots 11 are equal in size and shape.

Alternatively, the side lengths L1 and L2 of each of the optical dots 11 are both less than or equal to 100 μm.

In order to facilitate the processing of the optical dots 11, the side lengths L1 and L2 may be equal.

It should be noted that the smaller the size of the optical dots 11 are, the finer the control of the light is. Therefore, the specific size of the optical dots 11 can be adjusted according to the specific requirements of the backlight module to which the light guide plate 01 is applied.

In other embodiments, the plurality of optical dots 11 may also be in other arrangements as desired.

In other embodiments, as shown in FIG. 6, optical dots 11 are disposed as grooves recessed inwardly from a bottom surface 103.

In some embodiments, as shown in FIG. 5, a light guide plate includes a light guide layer 10, a grating layer 30, and a bonding layer 20 disposed between the light guide layer 10 and the grating layer 30 and bonding light guide layer 10 and the grating layer 30 together. A refractive index of the bonding layer 20, a refractive index of the light guide layer 10, and a refractive index of the grating layer 30 comply with the relationship: n2<n1, n2≤n3, where n1 is the refractive index of the light guide layer 10, n2 is the refractive index of the bonding layer 20, and n3 is the refractive index of the grating layer 30.

Here, when n2<n1, at least a part of light rays incident from the light incident surface 101 of the light guide layer 10 are allowed to be totally reflected at the light exiting surface 102, and reflected by optical dots 11 and then emitted from the light emitting surface 102. When n2≤n3, total reflection at an interface between the bonding layer 20 and the grating layer 30 is avoided, thereby ensuring that light rays are emitted from the bonding layer 20 into the grating layer 30.

It should be noted that when the grating layer 30 and the light guide layer 10 are in direct contact, that is, when the bonding layer 20 between the grating layer 30 and the light guide layer 10 is not present (as shown in FIGS. 1 and 2), the refractive index n3 of the grating layer 30 is configured to be smaller than the refractive index n1 of the light guide layer 10, that is, n3<n1, so the light rays are first totally reflected at a contact surface (i.e., the light exiting surface 102) between the light guide layer 10 and the grating layer 30 before reaching the optical dots 11. When the grating layer 30 and the light guide layer 10 are bonded together through the bonding layer 20, the materials of the grating layer 30 and the light guide layer 10 may be the same, that is, n3=n1.

In some embodiments, n2<1.45. The smaller the refractive index n2 is, the greater the difference between the refractive index of the bonding layer 20 and the refractive index of the light guide layer 10 is, and the smaller the total reflection angle of the light rays at the interface between the light guide layer 10 and the bonding layer 20 is. At locations close to the light source, the amount of light emitted directly from the light exit surface 102 of the light guide layer 10 without being adjusted by the optical dots 11 may be reduced, avoiding generation of bright lines, reducing light energy loss, and resulting in more uniform brightness.

The material of the light guide layer 10 may be a material that is easy to be processed. For example, the material of the light guide layer 10 may be any one of PMMA (Polymethyl Methacrylate), PC (Polycarbonate), PI (Polyimide), PES (Polyethersulfone resin) and PET materials. The light guide layer 10 may be fabricated by an imprinting process or an injection molding process.

In some embodiments, the light guide layer 10 can be made of PMMA, in which case n1=1.49.

In some embodiments, a thickness of the light guide layer 10 is in the range of 0.4~1 mm. For example, the thickness of the light guide layer 10 is 0.4 mm, or the thickness of the light guide layer 10 is 0.7 mm, or the thickness of the light guide layer 10 is 1 mm.

The material of the grating layer 30 can also be selected from materials that are easy to process. The material of the grating layer 30 may be the same as the material of the light guide layer 10 or may be different from the material of the light guide layer 10. The grating layer 30 can be fabricated by an embossing process or an injection molding process.

The bonding layer 20 is used to bond the light guide layer 10 and the grating layer 30. The material of the bonding layer 20 may be an optical adhesive. By way of example, the material of the bonding layer 20 may be UV optical adhesive, in which case n2 is 1.35.

In some embodiments, a thickness of the bonding layer 20 is in the range of 10~100 μm. For example, the thickness of the bonding layer 20 is 10 μm, or the thickness of the bonding layer 20 is 50 μm, or the thickness of the bonding layer 20 is 100 μm.

In the embodiment of the present disclosure, the light guide plate 01 may formed by separately forming the light guide plate 10 and the grating layer 30 and bonding the light guide layer 10 through the bonding layer 20. In this way, it is easy to process, easy for mass-produce, and low in cost.

Figure 7:
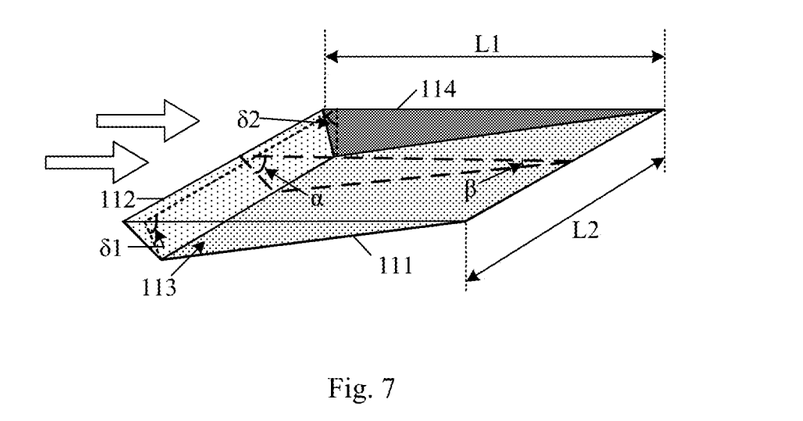
FIG. 7 is a schematic view of a structure of an optical dot according to at least one embodiment of the present disclosure.

In some embodiments, as shown in FIG. 7, each of the plurality of optical dots 11 has a second surface 112, a first surface 111, a third surface 113, and a fourth surface 114. The second surface 112 intersects the first surface 111. The third surface 113 intersects the second surface 112 and the first surface 111. The fourth surface 114 intersects the second surface 112 and the first surface 111. Also, the third surface 113 and the fourth surface 114 are opposed to each other.

In some embodiments, as shown in FIG. 5, the optical dots 11 are provided as protrusions that protrude outward from the bottom surface 103. The second side 112, the third side 111, the fourth side 113, and the fifth side 114 each intersect the bottom surface 103.

For example, as shown in FIG. 5, the second surface 112 is closer to the light incident surface 101 than the first surface 111.

The optical dots 11 mainly reflect the light rays from the light incident surface 101 through the first surface 111.

In the present embodiment, the intersection line between the first surface 111 and the bottom surface 103 is parallel to the light incident surface 101. In this case, the first surface 111 has a largest effective area for reflection.

In other embodiments, the intersection line between the first surface 111 and the bottom surface 103 may also be inclined with respect to the light incident surface 101.

FIG. 7 as described above shows a schematic view of a structure of an optical dot. FIG. 8-11A illustrate cross-sectional views of a light guide plate taken perpendicular to the light incident surface and the bottom surface, in accordance with at least one embodiment of the present disclosure. Referring to FIGS. 7-11A, in a cross section substantially perpendicular to both the light incident surface and the light exit surface, a first angle between the second surface and the light exit surface 102 is labeled as a, a second angle between the first surface 111 and the light exit surface 102 is labeled as β, and a third angle between a first inclined surface 402 to be described below and the light exit surface 102 is labeled as γ.

Figure 8:
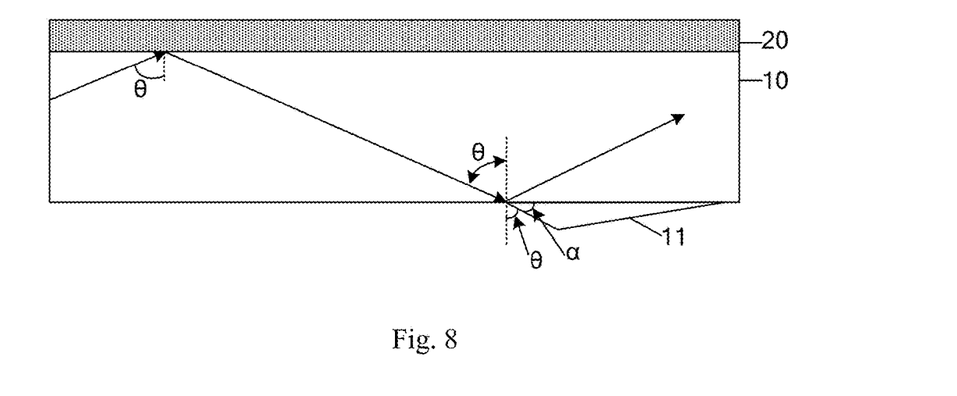
FIG. 8 is a schematic diagram of an optical path according to at least one embodiment of the present disclosure.

As shown in FIG. 8, it is assumed that the total reflection angle of the light rays at the interface (i.e., the light exit surface 102) between the light guide layer 10 and the bonding layer 20 is θ, $$\theta = \arcsin\left(\frac{n2}{n1}\right).$$

As can be seen from FIG. 8, when $$\alpha = \frac{\pi}{2} - \theta,$$

the light ray incident on the optical dot 11 is parallel to the second surface 112 of the optical dot 11, and when $$\alpha > \frac{\pi}{2} - \theta,$$

the light incident on the optical dot 11 is prevented from striking on the second surface 112 of the optical dot 11, preventing the second surface 112 from reflecting the light rays and thus destroying the optical path. Thus, the first angle α comply with:

$$\frac{\pi}{2} \geq \alpha > \frac{\pi}{2} - \arcsin\left(\frac{n2}{n1}\right).$$

It should be noted that the first angle α may also be slightly smaller than $$\frac{\pi}{2} - \arcsin\frac{n2}{n1}.$$

In this case, the amount of light incident on the second surface 112 of the optical dots 11 is small, and the influence is small.

For example, α can be in a range of 15~90°.

In some embodiments, the second angle β is in a range of 0.5~10°. For example, the second angle β is 0.5°, 3°, 5°, or 10°. In some embodiments, as shown in FIG. 7, a fourth angle δ1 between the third surface 113 and the bottom surface 103 is in a range of 50~90°. For example, the fourth angle M is 50°, 90°, or 75°. In this way, the processing of a dot-like structure of the light guide layer mold is facilitated.

A fifth angle δ2 between the fourth surface 114 and the bottom surface 103 is in a range of 50~90°. For example, the angle δ2 is 50°, or 90°, or 75°.

In order to facilitate the processing of the optical dots 11, values of 61 and 62 may be equal.

In some embodiments, as shown in FIGS. 3B-11A, the bottom surface 103 is parallel to the light exit surface 102. For example, the shape of the light guide layer 10 is a rectangular parallelepiped.

In some other embodiments, as shown in FIG. 3A, the bottom surface 103 is not parallel to the light exit surface 102. For example, the light guide layer 10 is wedge-shaped.

Figure 9A:
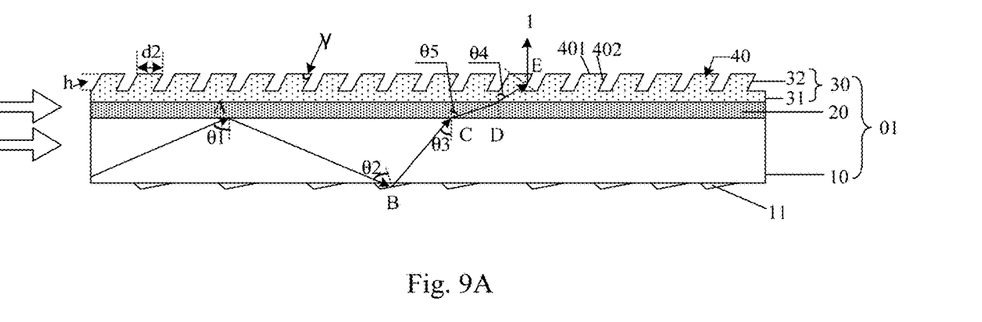
FIG. 9A is a schematic diagram of another optical path according to at least one embodiment of the present disclosure.
Figure 10A:
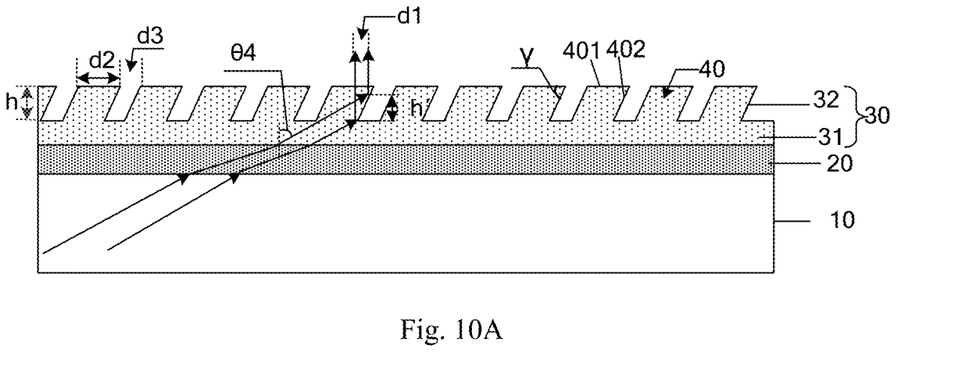
FIG. 10A is a schematic diagram of an optical path according to at least one embodiment of the present disclosure.

In some embodiments, as shown in FIGS. 9A and 10A, the grating strips 40 are sequentially arranged in a direction perpendicular to the light incident surface 101.

Each grating strip 40 includes a first inclined surface 402 and a second inclined surface, and these inclined surfaces are opposite to and parallel to each other, and a top surface 401 that connects the first inclined surface 402 and the second inclined surface. The first inclined surface 402 is further away from the light incident surface 101 than the second inclined surface. The top surface 401 is parallel to the light exit surface 102.

The third angle γ complies with:

$$\gamma = \frac{\pi}{2} - \frac{1}{2}\arcsin\left\{\frac{n1}{n3} \times \sin\left[\arcsin\left(\frac{n2}{n1}\right) - \beta\right]\right\}, \text{ and } \gamma \geq \arcsin\frac{1}{n3}.$$

In a cross section substantially perpendicular to both the light incident surface 101 and the light exit surface 102, the height h of the grating strip 40 complies with $$h \geq \frac{(1 + \cos\theta 4_{min})}{\tan\theta 4_{min}} \times d2, \text{ where } \theta 4_{min} = \arcsin\left\{\frac{n1}{n3} \times \sin\left[\arcsin\left(\frac{n2}{n1}\right) - 2\beta\right]\right\},$$

where θ4 is an exit angle of a light ray refracted from the bonding layer 20 into the grating layer 30, and d2 is the width of the grating strip 40.

To achieve a light collimating effect of the grating strip 40 in one dimension, an optical path in the light guide plate 01 can be, for example, an optical path as shown in FIG. 9A.

As shown in FIG. 9A, when light strikes the interface between the light guide layer 10 and the bonding layer 20 (i.e., at the light incident surface 102), total reflection occurs (for example, a light ray 1 in FIG. 10A is totally reflected at point A). In this case, the incident angle of the light ray 1 is θ1, θ1≥θ. Thereafter, the light ray 1 is reflected back into the light guide layer 10 and reaches the optical dot 11 at the bottom surface 103 of the light guide layer 10 (for example, the light ray 1 is totally reflected at point A and reaches point B). In this case, the incident angle of the light ray is θ2.

Figure 9B:
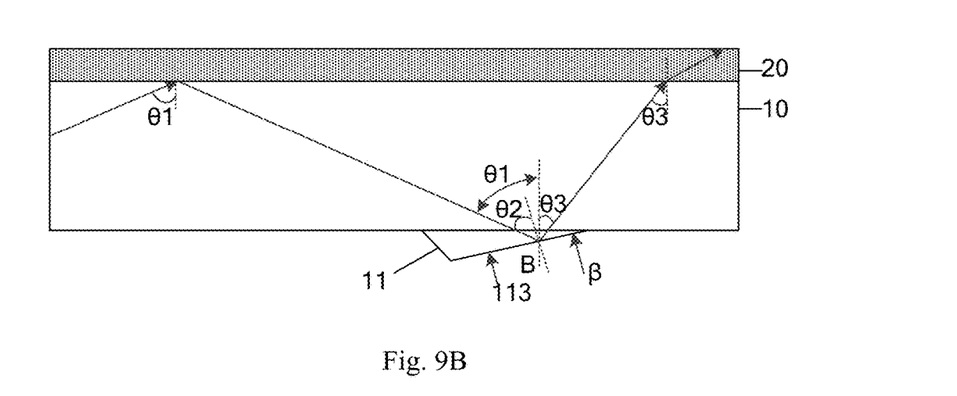
FIG. 9B is a partial schematic view of the optical path of FIG. 9A.

Referring to FIG. 9B, at point B, the angle between the light ray and the vertical direction is θ1. The angle between the normal line of the first surface 111 of the optical dots 11 and the normal line of the bottom surface 103 of the light guide layer 10 is equal to β. Because the bottom surface 103 is parallel to the light incident surface 102, θ2=θ1-β. When light is incident on the interface between the light guide layer 10 and the bonding layer 20, an angle between the normal line of the light incident surface 102 and the light ray is θ3, θ3=θ2-β=θ1-2β. Therefore, the angle between the light ray 1 reflected by the first surface 111 of the optical dots 11 and the vertical direction is reduced by 2β. The optical dot 11 adjusts the angle between the reflected light ray and the vertical direction with an accuracy of 2β. When θ3<θ, as shown in FIG. 9A, light is emitted from the light exit surface 102 of the light guide layer 10 at an angle θ5, and enters the bonding layer 20. Here, because θ1≥θ, θ3=θ1-2β≥θ-2β, a range of θ3 is θ>θ3≥θ-2β.

Figure 10B:
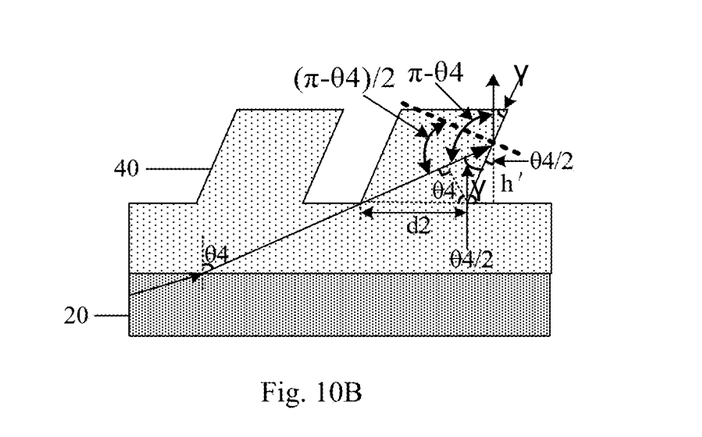
FIG. 10B is a partial schematic view of the optical path of FIG. 10A.

As shown in FIGS. 9A, 10A and 10B, the light ray entering the bonding layer 20 is refracted at the interface between the bonding layer 20 and the grating layer 30, and is incident on the grating layer 30 at an angle of θ4 (for example, the light ray reflected at point B enters into the bonding layer at point C and then is emitted at point D of the bonding layer 20). The light rays incident on the grating layer 30 from the bonding layer 20 are near-parallel rays, and the maximum angular differences among these light rays is θ4$_{max}$-θ4$_{min}$. On the basis of this, in the case where the light ray entering the grating layer 30 is incident on the inclined surface 402 of the grating strip 40 (for example, the light entering the grating layer 30 at the D point is incident on E point), the light ray is able to be emitted with being collimated in one dimension after being reflected by the inclined surface 402.

Thus, in the case where the light ray is incident on the grating layer 30 at the angle of θ4, in order to ensure that the light ray can be incident on the inclined surface 402 of the grating strip 40, and thus to guarantee that the light ray is emitted, with being collimated, on the top surface 401 of the grating strip 40 after being totally reflected from the inclined surface 402, the height h of the grating strip 40 and the angle γ comply with certain conditions.

Firstly, for the purpose that the light ray is totally reflected on the first inclined surface 402 of the grating strip 40, γ complies with the total reflection condition, that is, $$\gamma \geq \arcsin\frac{1}{n3}.$$

Secondly, referring to FIGS. 10A and 10B, when the light ray incident on the inclined surface 402 of the grating strip 40 is totally reflected, $$\gamma = \frac{(\pi - \theta 4)}{2},$$

which is called as Formula I.

As shown in FIG. 9A, based on the principle of refraction, when the light ray is incident on the bonding layer 20 from the light guide layer 10 and is incident on the grating layer 30 from the bonding layer 20, the following relationship is obtained:

$$n1 \times \sin\theta 3 = n2 \times \sin\theta 5 \qquad \text{Formula II};$$

$$n2 \times \sin\theta 5 = n3 \times \sin\theta 4 \qquad \text{Formula III}.$$

According to Formula II and Formula III, the following is obtained: $n1 \times \sin\theta 3 = n3 \times \sin\theta 4$, and therefore calculation can be conducted:

$$\theta 4 = \arcsin\left(\frac{n1}{n3} \times \sin\theta 3\right). \qquad \text{Formula IV}$$

As described above, $\theta > \theta 3 \geq \theta - 2\beta$ takes an intermediate value, that is, $\theta 3 = \theta - \beta$. Bring $\theta 3 = \theta - \beta$ into Formula IV, the intermediate value $\theta 4_{med}$ of $\theta 4$ can be obtained:

$$\theta 4_{med} = \arcsin\left\{\frac{n1}{n3} \times \sin\left[\arcsin\left(\frac{n2}{n1}\right) - \beta\right]\right\}. \qquad \text{Formula V}$$

Bring Formula V into Formula I to get:

$$\gamma = \frac{(\pi - \theta 4_{med})}{2} =$$
$$\frac{\pi}{2} - \frac{1}{2}\arcsin\left(\frac{n1}{n3} \times \sin\theta 3\right) = \frac{\pi}{2} - \frac{1}{2}\arcsin\left\{\frac{n1}{n3} \times \sin\left[\arcsin\left(\frac{n2}{n1}\right) - \beta\right]\right\}.$$

It can be seen from Formula V that the value of $\theta 4$ depends on the refractive indexes of the material of the light guide layer 10 and the material of the bonding layer 20, and the second angle $\beta$. Based on this, by adjusting the values of n1, n2 and $\beta$, light ray can be allowed to be incident on the inclined surface 402 of the grating strip 40.

The value of $\gamma$ is calculated by taking the intermediate value of $\theta 3$. After being totally reflected by the inclined surface 402 of the grating strip 40, the angle of the light ray emitted changes within a range of 90°±x. Thus, the deviation of the emitted light with respect to 90° is small.

Further, based on the above, when $\theta 3$ takes the maximum value, i.e., $\theta 3 = \theta$, it is brought into Formula IV, and the maximum value $\theta 4_{max}$ of $\theta 4$ is obtained, $$\theta 4_{max} = \arcsin\left(\frac{n2}{n3}\right).$$

When $\theta 3$ takes the minimum value, i.e., $\theta 3 = \theta - 2\beta$, it is brought into Formula IV, the minimum value $\theta 4_{min}$ of $\theta 4$ is obtained, $$\theta_{min} = \arcsin\left\{\frac{n1}{n3} \times \sin\left[\arcsin\left(\frac{n2}{n1}\right) - 2\beta\right]\right\}.$$

Referring to FIGS. 10A and 10B, to ensure that the light ray directed toward the grating strip 40 strikes the inclined surface 402 of the grating strip 40, the grating strip 40 should have a minimum height h'.

Because $$h' \times \tan\left(\frac{\theta 4}{2}\right) = d2 \times \cos\theta 4, \text{ and}$$

$$d2 + h' \times \tan\left(\frac{\theta 4}{2}\right) = h' \times \tan\theta 4,$$

$$d2 + h' \times \tan\frac{\theta 4}{2} = d2 + d2 \times \cos\theta 4 = h' \times \tan\theta 4.$$

Based on this, $$h' = d2 \times \frac{(1 + \cos\theta 4)}{\tan\theta 4} = d2 \times \frac{2\cos^2\left(\frac{\theta 4}{2}\right)}{\tan\theta 4},$$

where d2 is the width of the grating strip 40.

The height h of the grating strip 40 should be greater than or equal to h', i.e., $$h \geq \frac{(1 + \cos\theta 4)}{\tan\theta 4} \times d2.$$

When $\theta 4$ is a constant, h'=f(d2) is an increasing function. That is, the larger d2 is, the larger h' is. When d2 is a constant, h'=f($\theta 4$) is a decreasing function. That is, the larger $\theta 4$ is, the smaller h' is.

When $\theta 4$ is the minimum value $\theta 4_{min}$, h' is the maximum value h'$_{max}$, and when h is greater than or equal to h'$_{max}$, i.e., $$h \geq \frac{(1 + \cos\theta 4_{min})}{\tan\theta 4_{min}} \cdot d2,$$

it is ensured that the light directed toward the grating strip 40 strikes the inclined surface 402 of the grating strip 40.

Here, according to a formula:

$$d1 = \frac{h'}{\tan\gamma} = h' \times \tan\frac{\theta 4}{2} = d2 \times \cos\theta 4,$$

where d1 is the width of the effective light-emitting region of the grating strip 40 in the grating layer 30 (as shown in FIG. 10A), it can be seen that d1<d2.

Thus, the smaller the spacing d3 between adjacent grating strips 40, the better effect is. The spacing d3 may be set according to the processing technique.

In at least one embodiment of the present disclosure, the light ray from the light incident surface 101 is deflected by the first surface 111 of the optical dot 11 toward the grating strip 40 of the grating layer 30. By adjusting the second angle $\beta$, the angle between the light rays reflected by the first surface 111 and the normal line of the light exit surface 102 is adjusted, and the light paths are scattered so that the light rays are emitted from the light exit surface 102.

Figure 11A:
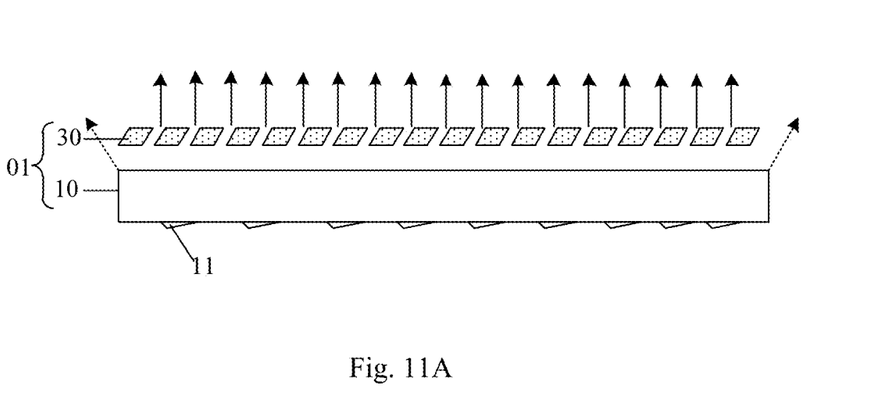
FIG. 11A is a schematic diagram of an optical path according to at least one embodiment of the present disclosure.
Figure 11B:
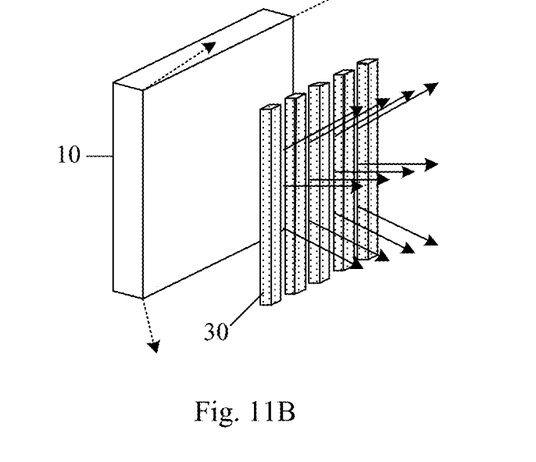
FIG. 11B is a side view of the optical path of FIG. 11A.

The grating layer 30 including the plurality of grating strips 40 causes the light rays to be emitted, with being collimated in one dimension, from the light guide plate 01 after being totally reflected, reducing the cutoff angle and the half brightness angle. As shown in FIGS. 11A and 11B, the plurality of grating strips 40 of the grating layer 30 deflect the light emitted from the light exit surface 102 toward the normal line of the light exit surface 102.

In some embodiments, as shown in FIGS. 2, 5-6, 9A and 10A, the grating layer 30 includes a base sub-layer 31 and a grating sub-layer 32, and the base sub-layer 31 is disposed adjacent to the light guide layer 10. For example, the base sub-layer 31 and the grating sub-layer 32 may be integrated as a single piece, for example, without an interface therebetween. For example, the shape of the base sub-layer 31 is a rectangular parallelepiped, and the grating sub-layer 32 includes a plurality of grating strips 40 parallel to and equally spaced with each other.

The thickness of the base sub-layer 31 may be set according to the material strength and the process. For example, the material of the grating layer 30 may be PET (Polyethylene terephthalate) or UV glue. When the grating layer 30 is formed by a transfer process, the thickness of the base sub-layer 31 may be greater than or equal to 0.05 mm. For example, when the grating layer 30 is of other materials such as PC or PMMA, and the grating layer 30 is formed by an injection molding process or an imprinting process, the thickness of the base sub-layer 31 is 0.25 mm or more.

The grating layer 30 including the base sub-layer 31 and the grating sub-layer 32 is easily fabricated by a related process and is easily bonded with the light guide layer 10 by the bonding layer 20.

Figure 12:
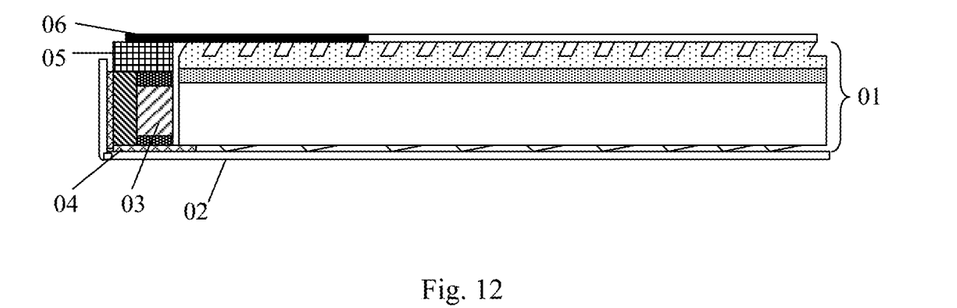
FIG. 12 is a schematic view of a structure of an optical module according to at least one embodiment of the present disclosure.

At least one embodiment of the present disclosure further provides a backlight module, as shown in FIG. 12, including a back plate 02, a light guide plate 01 disposed on the back plate 02, and a light source 03 disposed on a side of the light guide plate 01 with the light incident surface 101 being on the side. The light guide plate 01 may be any one of the light guide plates described above.

Alternatively, the backlight module does not include a reflective sheet or a reflective coating, and the light guide plate 01 is in direct contact with the back plate 02. Thus, the backlight module has a low thickness, high integration, a simple structure, and low cost.

Alternatively, a protective film is disposed between the light guide plate 01 and the back plate 02. For example, the material of the protective film may be PET.

The backlight module can be a LED (Light Emitting Diode) direct-type backlight module (used as a large-size backlight in devices such as a tablet computer) or a COB (Chip On Board) direct-type backlight module.

FIG. 12 is a schematic diagram of a COB direct-type backlight module of a light guide plate according to an embodiment of the present disclosure. The COB direct-type backlight module includes the back plate 02, the light guide plate 01 directly in contact with the back plate 02, and the COB light source 03 disposed on a side of the light guide plate 01 with the light incident surface 101 being on the side. The COB light source 03 is fixed by a COB fixing glue 04. A spacer tape 05 is disposed above the COB light source 03 along a direction perpendicular to the light guide plate 01. A light-shielding glue (e.g., an adhesive mixed with light-shielding particles) 06 is disposed above the light-emitting side of a portion, near the pad upper layer 05, of the light guide plate 01 and above the spacer tape 05. That is, at least a portion of the light shielding glue 06 is applied above the grating layer 30 of the light guide plate 01, and on the side close to the light incident surface 101.

The material of the back plate 02 may be stainless steel.

Figure 13:
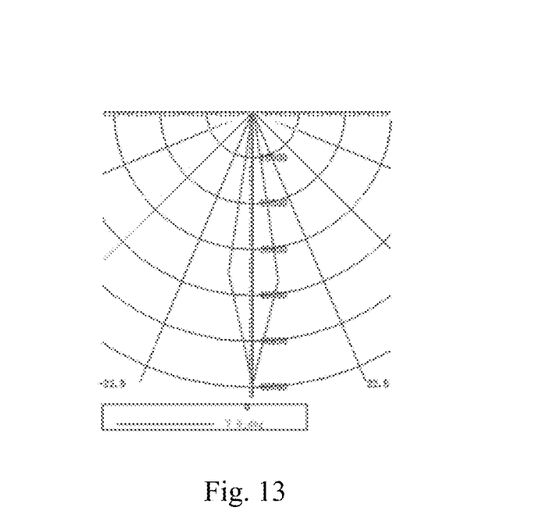
FIG. 13 is an angular brightness diagram of an optical module according to at least one embodiment of the present disclosure.
Figure 14:
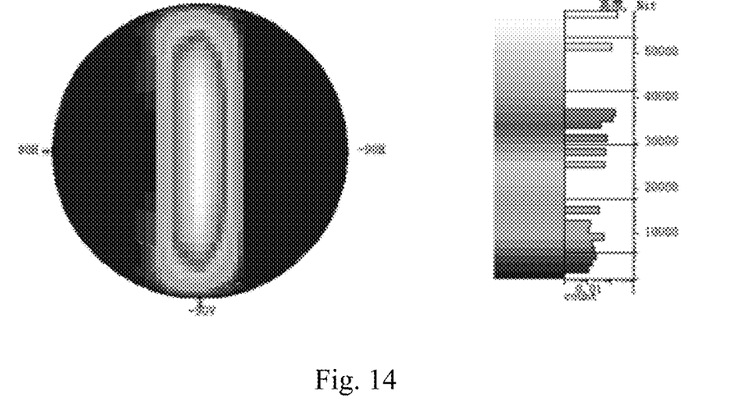
FIG. 14 is an angular brightness grating diagram of the optical module according to at least one embodiment of the present disclosure.

As shown in FIGS. 13 and 14, in an optical model built in an optical system modeling software, the half brightness angle of the COB backlight module is <±10°, and the cutoff angle is <±20°. The backlight module of the embodiments of the present disclosure significantly reduces the half brightness angle and the cutoff angle, achieving a good anti-spying effect.

Figure 15:
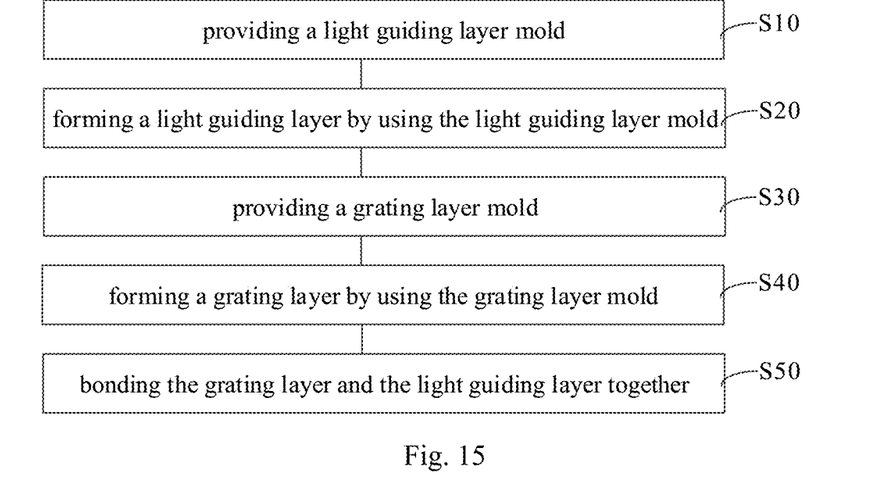
FIG. 15 is a flowchart for preparing a light guide plate according to at least one embodiment of the present disclosure.

Embodiments of the present disclosure also provide a method of fabricating a light guide plate that may be used to fabricate any of the light guide plates described above. As shown in FIG. 15, the method includes the following steps:

S10, providing a light guide layer mold 70.

Figure 16A:
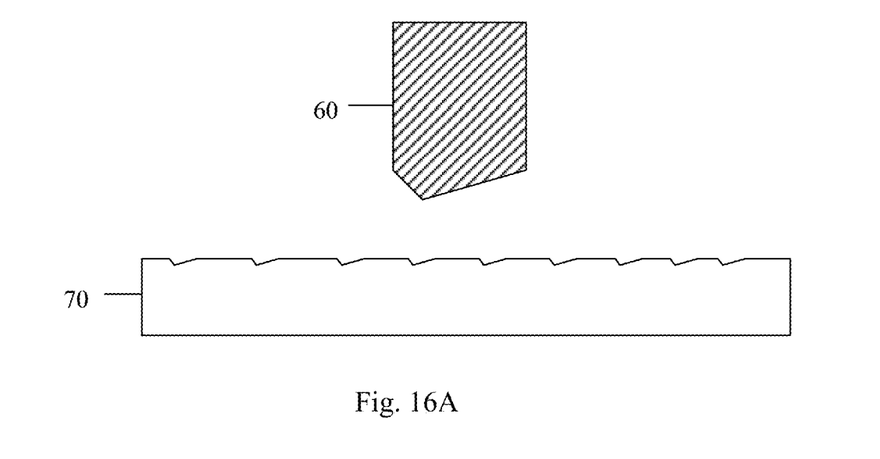
FIG. 16A is a schematic view showing a processing of a light guide layer mold according to at least one embodiment of the present disclosure.

Referring to FIG. 16A, dot structures of the light guide layer mold 70 may be formed by an engraving process of a graver 60 or a striking process of a striker, and each dot structure of light guide layer mold is complementary to the optical dot of the light guiding plate in shape.

For example, in the case where the dot structure is formed by the striking of a striker, the head of the striker has a same shape as that of the optical dot.

The dot structure formed by engraving has higher precision with respect to the dot structure formed by striking, but the engraving process has a lower efficiency and a higher cost than the striking process. The dot structure is arranged according to a light effect requirement of the light guide layer 10 to ensure brightness uniformity of the backlight module.

S20, forming the light guide layer by using the light guide layer mold.

Figure 16B:
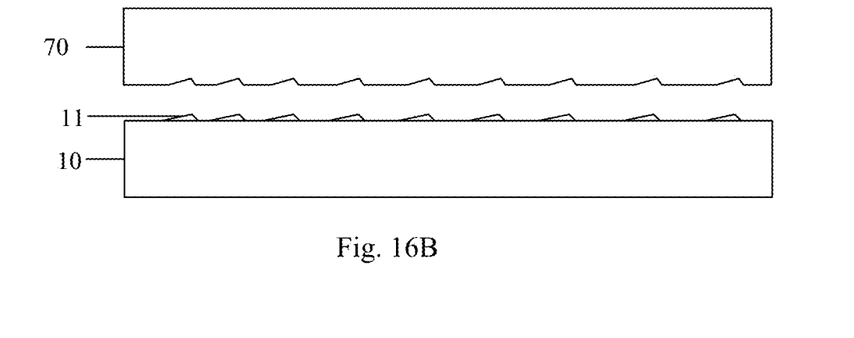
FIG. 16B is a schematic view showing a processing of a light guide layer according to at least one embodiment of the present disclosure.

Referring to FIG. 16B, the light guide layer 10 may be formed by an injection molding process or an imprinting process by using the light guide layer mold 70.

S30, providing a grating layer mold 90.

Figure 17A:
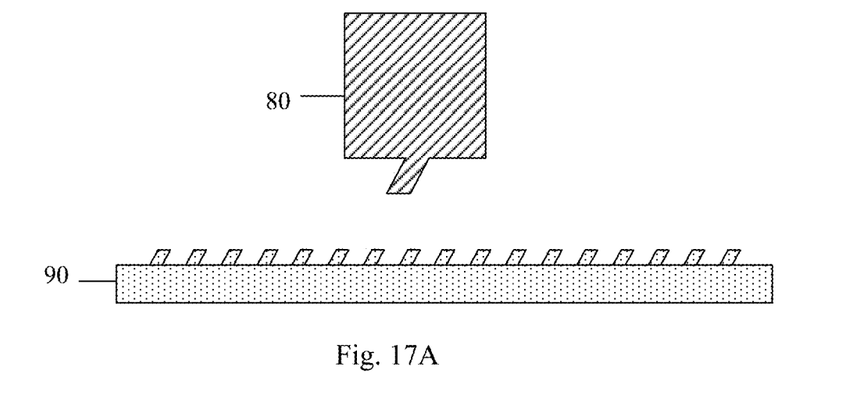
FIG. 17A is a schematic view showing a processing of a grating layer mold according to at least one embodiment of the present disclosure.

Referring to FIG. 17A, grating strip structures of the grating layer mold 90 may be formed by a scraping process of a scraper 80. Each of the grating strip structures of the grating layer mold is complementary to the grating strips in shape.

S40, forming a grating layer by using the grating layer mold 90.

Figure 17B:
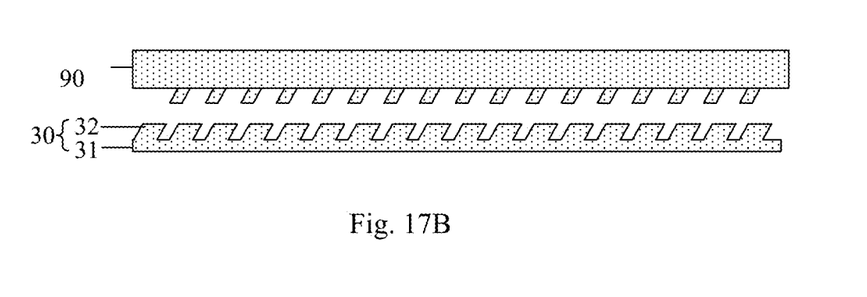
FIG. 17B is a schematic view showing a processing of a grating layer according to at least one embodiment of the present disclosure.

Referring to FIG. 17B, the grating layer 30 may be formed by an injection molding process or an imprinting process by using the grating layer mold 90.

In the case where the grating layer 30 is formed by the injection molding process, the parting direction (i.e., the direction to release the mold) may be parallel to the inclined surface 402 of the grating strip 40 to avoid damaging the oblique angle of the grating strip 40, thereby making the grating layer 30 produced more precise. Similarly, in the case where the grating layer 30 is formed by an imprinting process, the imprinting direction may be parallel to the inclined surface 402 of the grating strip 40 to avoid damaging the oblique angle of the grating strip 40, thereby making the grating layer 30 produced more precise.

S50, bonding the grating layer and the light guide layer together.

For example, the grating layer 30 and the light guide layer 10 may be bonded together by the bonding layer 20.

For example, the adhesive layer 20 may be bonded to the side of the light guide layer 10 opposite to the side on which the optical dot is disposed, and then the side of the bonding layer 20 away from the light guide layer 10 may be bonded to the grating layer 30. For example, the bonding layer 20 and the grating layer 30 may be bonded first, and the side of the bonding layer 20 away from the grating layer 30 may be bonded to the light guide layer 10 then.

The grating layer 30 and the light guide layer 10 may be vacuum-bonded. Air bubbles should by avoid.

The flatness of the bonding layer 20 is ensured, avoiding the change in the optical path caused by the unevenness that affects the light rays entering the grating layer 30 and thus affects the anti-spying effect and the brightness of the entire light guiding plate 01.

In the method of fabricating the light guide plate according to at least an embodiment of the present disclosure, the light guide layer mold 70 with the dot structures is formed by the striking process of the striker or by the engraving process of the graver 60, and the light guide layer 10 is formed by the injection molding process or the imprinting process using the light guide layer 70. The grating layer mold 90 is formed by the scraping of the scraper 80, and the grating layer 30 is formed the injection molding process or the imprinting process using the grating layer mold 90. The grating layer 30 and the light guide layer 10 are bonded by the bonding layer 20, thereby forming the light guiding plate 01 with the optical dots 11 and the grating layer 30. The light guide plate 01 is highly integrated, has a simple structure, is easy to process, has low cost, and is easy for mass-produce. Further, in the case where the light is reflected without using a reflective sheet or a reflective coating, the light guide plate 01 achieves a good anti-spying effect by a simple structure.

The foregoing are merely exemplary embodiments of the disclosure, but are not used to limit the protection scope of the disclosure. Any variation or substitutions easily made by the person skilled in the art shall be covered within the scope of the present disclosure. The protection scope of the disclosure shall be defined by the attached claims.

What is claimed is:

1. A light guide plate comprising:
   a light guide layer, comprising a light incident surface, a light exit surface, and a bottom surface opposite to the light exit surface; and
   a grating layer, disposed on a side of the light guide layer with the light exit surface being on the side and comprising a plurality of grating strips,
   wherein the bottom surface is provided with a plurality of optical dots,
   the plurality of optical dots are configured to deflect light rays from the light incident surface toward the grating strips,
   the plurality of grating strips are configured to deflect light rays emitted from the light exit surface toward a normal line of the light exit surface,
   a refractive index of the light guide layer is configured to allow total reflection of light to occur on the light exit surface,
   each of the plurality of optical dots comprises a first surface configured to reflect the light rays from the light incident surface toward the grating strips, and
   each of the plurality of grating strips comprises a first inclined surface configured to reflect the light rays emitted from the light exit surface toward the normal line of the light exit surface.

2. The light guide plate according to claim 1, wherein the bottom surface is parallel to the light exit surface.

3. The light guide plate of claim 1, further comprising:
   a bonding layer,
   wherein the light guide layer and the grating layer are bonded by the bonding layer, and
   a refractive index of the bonding layer, the refractive index of the light guide layer, and a refractive index of the grating layer comply with: n2<n1, n2≤n3, where n1 is the refractive index of the light guide layer, n2 is the refractive index of the bonding layer, and n3 is the refractive index of the grating layer.

4. The light guide plate according to claim 3, wherein the refractive index of the bonding layer complies with: n2<1.45.

5. The light guide plate according to claim 3, wherein in a cross section substantially perpendicular to both the light incident surface and the light exit surface, a second angle β between the first surface and the light exit surface is in a range of 0.5~10°.

6. The light guide plate according to claim 3, wherein each of the plurality of optical dots further comprises a second surface,
   the second surface intersects the first surface, and
   in a cross section substantially perpendicular to both the light incident surface and the light exit surface, a first angle α between the second surface and the light exit surface complies with:

$$\frac{\pi}{2} \geq \alpha > \frac{\pi}{2} - \arcsin\left(\frac{n2}{n1}\right).$$

7. The light guide plate according to claim 6, wherein the plurality of optical dots are protrusions protruding outward from the bottom surface, and
   the second surface is closer to the light incident surface than the first surface.

8. The light guide plate according to claim 6, wherein the plurality of optical dots are grooves recessed inward from the bottom surface, and
   the first surface is closer to the light incident surface than the second surface.

9. The light guide plate according to claim 6, wherein each of the plurality of optical dots further comprises a third surface and a fourth surface disposed opposite to each other,
   the third surface intersects the second surface and the first surface,
   the fourth surface intersects the second surface and the first surface,
   a fourth angle δ1 between the third surface and the bottom surface is in a range of 50~90°, and
   a fifth angle δ2 between the fourth surface and the bottom surface is in a range of 50~90°.

10. The light guide plate according to claim 3, wherein in a cross section substantially perpendicular to both the light incident surface and the light exit surface, a second angle β between the first surface and the light exit surface and a third angle γ between the first inclined surface and the light exit surface complies with:

$$\gamma = \frac{\pi}{2} - \frac{1}{2}\arcsin\left\{\frac{n1}{n3} \times \sin\left[\arcsin\left(\frac{n2}{n1}\right) - \beta\right]\right\},$$

$$\gamma \geq \arcsin\frac{1}{n3}.$$

11. The light guide plate according to claim 3, wherein each of the plurality of grating strips further comprises a light reflecting layer provided on the first inclined surface.

12. The light guide plate according to claim 3, wherein each of the plurality of grating strips further comprises: a second inclined surface and a top surface connecting the first inclined surface and the second inclined surface, the first inclined surface and the second inclined surface are opposite and parallel to each other, the first inclined surface is further away from the light incident surface than the second inclined surface, and the top surface is parallel to the light exit surface.

13. The light guide plate according to claim 3, wherein in a cross section substantially perpendicular to both the light incident surface and the light exit surface, a second angle between the first surface and the light exit surface and a height h of the grating strips and a width d2 of the grating strips complies with:

$$h \geq \frac{(1 + \cos\theta 4_{min})}{\tan\theta 4_{min}} \times d2,$$

where $\theta 4_{min} = \arcsin\left\{\frac{n1}{n3} \times \sin\left[\arcsin\left(\frac{n2}{n1}\right) - 2\beta\right]\right\}$.

14. The light guide plate according to claim 1, wherein the plurality of grating strips are arranged in parallel and equidistantly in a direction perpendicular to the light incident surface.

15. The light guide plate according to claim 1, wherein the grating layer comprises a base sub-layer and a grating sub-layer, the base sub-layer and the grating sub-layer are integrated as a single piece, and the base sub-layer is disposed closer to the light guide layer, a shape of the base sub-layer is a rectangular parallelepiped, and the grating sub-layer comprises the plurality of grating strips arranged in parallel and equidistantly.

16. The light guide plate according to claim 1, wherein a density of the plurality of optical dots gradually increases in a direction away from the light incident surface.

17. A backlight module comprising:
a backboard;
a light guide plate disposed on the backboard; and
a light source disposed on a side of the light guide plate with a light incident surface being on the side,
wherein the light guide plate comprises:
a light guide layer having the light incident surface, a light exit surface, and a bottom surface opposite to the light exit surface, the bottom surface being provided with a plurality of optical dots; and
a grating layer disposed on a side of the light guide layer with the light exit surface and comprising a plurality of grating strips, wherein the plurality of optical dots are configured to deflect light rays from the light incident surface toward the grating strips, the plurality of grating strips are configured to deflect light rays emitted from the light exit surface toward a normal line of the light exit surface, a refractive index of the light guide layer is configured to allow total reflection of light to occur on the light exit surface, each of the plurality of optical dots comprises a first surface configured to reflect the light rays from the light incident surface toward the grating strips, and each of the plurality of grating strips comprises a first inclined surface configured to reflect the light rays emitted from the light exit surface toward the normal line of the light exit surface.

18. A display device comprising:
a display panel; and
the backlight module according to claim 17 disposed on a light incident side of the display panel.

19. A method of fabricating a light guide plate, the method comprising:

forming a light guide layer by using a light guide layer mold, wherein the light guide layer comprises a light incident surface, a light exit surface, and a bottom surface opposite to the light exit surface, and the bottom surface is provided with a plurality of optical dots;

forming a grating layer by using a grating layer mold, wherein the grating layer is disposed on a side of the light guide layer with the light exit surface being on the side, and the grating layer comprises a plurality of grating strips; and bonding the grating layer and the light guide layer, wherein the plurality of optical dots are configured to deflect light rays from the light incident surface toward the grating strips, and the plurality of grating strips are configured to deflect light rays emitted from the light exit surface toward a normal line of the light exit surface, a refractive index of the light guide layer is configured to allow total reflection of light to occur on the light exit surface, each of the plurality of optical dots comprises a first surface configured to reflect the light rays from the light incident surface toward the grating strips, and each of the plurality of grating strips comprises a first inclined surface configured to reflect the light rays emitted from the light exit surface toward the normal line of the light exit surface.

* * * * *